US012532209B2

(12) United States Patent
Cui et al.

(10) Patent No.: US 12,532,209 B2
(45) Date of Patent: Jan. 20, 2026

(54) MEASUREMENT DESIGN FOR NEXT RADIO (NR) AND LONG TERM EVOLUTION (LTE)

(71) Applicant: Apple Inc., Cupertino, CA (US)

(72) Inventors: Jie Cui, San Jose, CA (US); Yang Tang, San Jose, CA (US); Rui Huang, Beijing (CN); Yuan Zhu, Beijing (CN); Shuang Tian, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/399,097

(22) Filed: Dec. 28, 2023

(65) Prior Publication Data
US 2024/0205716 A1 Jun. 20, 2024

Related U.S. Application Data

(63) Continuation of application No. 17/589,626, filed on Jan. 31, 2022, now Pat. No. 11,864,016, which is a
(Continued)

(51) Int. Cl.
H04W 24/10 (2009.01)
H04L 27/26 (2006.01)
(Continued)

(52) U.S. Cl.
CPC ......... *H04W 24/10* (2013.01); *H04L 27/2613* (2013.01); *H04L 27/26136* (2021.01); *H04W 28/06* (2013.01); *H04W 36/0088* (2013.01)

(58) Field of Classification Search
CPC . H04W 24/10; H04W 36/0088; H04W 28/06; H04W 36/0094; H04W 56/001;
(Continued)

(56) References Cited

U.S. PATENT DOCUMENTS 7,164,726 B1   1/2007 Trott
7,164,739 B1   1/2007 Trott et al.
(Continued)

FOREIGN PATENT DOCUMENTS

CN   103039108   4/2013
CN   104335631   2/2015
(Continued)

OTHER PUBLICATIONS

Intel Corporation, "Further Considerations on the Measurement Gap Pattern in HeNet," 3GPP TSG RAN WG4 Meeting #70, R4-140613, Agenda Item: 7.3, Feb. 10-14, 2014, Prague, Czech Republic, 5 pages.
(Continued)

*Primary Examiner* — Joseph Arevalo
(74) *Attorney, Agent, or Firm* — Fish & Richardson P.C.

(57) ABSTRACT

An invention to perform a method of cell measurement in a wireless network, wherein the wireless network comprises a plurality of frequency layers, the invention configured to: determine a Measurement Gap Length, MGL, for each one of the plurality of frequency layers operational in the wireless network; determine a gap bitmap to indicate a measurement gap availability in a time sequence for each one of the plurality of frequency layers of the wireless network; and transmit gap assistance information for each one of the plurality of frequency layers of the wireless network to a User Equipment, wherein the gap assistance information comprises at least the determined Measurement Gap Length and the determined gap bitmap.

18 Claims, 8 Drawing Sheets

Related U.S. Application Data continuation of application No. 16/604,982, filed as application No. PCT/US2018/032338 on May 11, 2018, now Pat. No. 11,240,692.

(60) Provisional application No. 62/505,526, filed on May 12, 2017.

(51) Int. Cl.
*H04W 28/06* (2009.01)
*H04W 36/00* (2009.01)

(58) Field of Classification Search
CPC ............ H04W 24/08; H04W 36/0016; H04W 36/0058; H04W 4/06; H04W 48/06; H04W 48/12; H04W 52/0216; H04W 72/02; H04W 72/0446; H04W 72/20; H04W 72/23; H04W 72/52; H04W 72/54; H04W 72/541; H04W 72/542; H04W 76/20; H04W 88/02; H04W 88/06; H04W 88/08
USPC .................... 370/330, 252, 329, 331, 503
See application file for complete search history.

(56) References Cited

U.S. PATENT DOCUMENTS

| | | | |
|---|---|---|---|
| 7,433,347 B1 | 10/2008 | Trott et al. | |
| 9,848,340 B2 | 12/2017 | Kazmi et al. | |
| 10,021,705 B2* | 7/2018 | Franz | H04W 72/52 |
| 10,732,844 B1 | 8/2020 | Zaydman et al. | |
| 10,932,147 B2* | 2/2021 | Huang | H04W 24/10 |
| 11,172,389 B2* | 11/2021 | Yiu | H04W 24/10 |
| 11,240,692 B2 | 2/2022 | Cui et al. | |
| 11,864,016 B2 | 1/2024 | Cui et al. | |
| 2002/0118371 A1 | 8/2002 | Jiang et al. | |
| 2004/0132454 A1 | 7/2004 | Trott et al. | |
| 2009/0191883 A1 | 7/2009 | Choi et al. | |
| 2012/0184290 A1 | 7/2012 | Kazmi et al. | |
| 2014/0094188 A1 | 4/2014 | Kazmi et al. | |
| 2015/0215803 A1 | 7/2015 | Huang et al. | |
| 2015/0327103 A1* | 11/2015 | Tang | H04W 72/0453 370/252 |
| 2016/0302098 A1* | 10/2016 | Gheorghiu | H04W 56/001 |
| 2017/0013630 A1 | 1/2017 | Franz et al. | |
| 2017/0070312 A1* | 3/2017 | Yi | H04W 72/541 |
| 2018/0034598 A1* | 2/2018 | Yiu | H04W 36/0094 |
| 2018/0083748 A1 | 3/2018 | Tang et al. | |
| 2018/0145819 A1* | 5/2018 | Axmon | H04W 56/005 |
| 2018/0213425 A1 | 7/2018 | Huang et al. | |
| 2019/0297667 A1* | 9/2019 | Quan | H04L 1/1848 |
| 2019/0306734 A1* | 10/2019 | Huang | H04W 24/08 |
| 2021/0006995 A1 | 1/2021 | Cui et al. | |
| 2021/0014751 A1 | 1/2021 | Callender et al. | |
| 2021/0058807 A1 | 2/2021 | Cui et al. | |
| 2021/0105646 A1* | 4/2021 | Siomina | H04W 24/08 |
| 2021/0227479 A1* | 7/2021 | Harada | H04L 27/2601 |
| 2022/0159498 A1 | 5/2022 | Cui et al. | |

FOREIGN PATENT DOCUMENTS

| | | |
|---|---|---|
| CN | 104349378 | 2/2015 |
| CN | 106416350 | 2/2017 |
| EP | 2385723 | 11/2011 |
| WO | WO 2015126568 | 8/2015 |
| WO | WO 2018204383 | 11/2018 |
| WO | WO 2018209247 | 11/2018 |

OTHER PUBLICATIONS

Intel Corporation, "On Measurement Gap Enhancement for Hetnet," 3GPP TSG RAN WG4 Meeting #75, R4-153583, Agenda Item: 9.4.1, May 25-29, 2015, Fukuoka, Japan, 3 pages.

Intel Corporation, "On Measurement Gap Enhancement," 3GPP TSG RAN WG4 Meeting #74bis, R4-152185, Agenda Item: 9.4.1, Apr. 20-24, 2015, Rio de Janeiro, Brazil, 4 pages.

PCT International Preliminary Report on Patentability in International Appln. No. PCT/US2018/032338, dated Nov. 12, 2019, 10 pages.

PCT International Search Report and Written Opinion in International Appln. No. PCT/US2018/032338, dated Sep. 11, 2018, 14 pages.

Samsung, "Measurement Gap for NR," 3GPP TSG RAN WG2 Meeting #97bis, R2-1702981, Agenda Item: 10.4.1.3, Apr. 3-7, 2017, Spokane, Washington, USA, 3 pages.

* cited by examiner

MEASUREMENT DESIGN FOR NEXT RADIO (NR) AND LONG TERM EVOLUTION (LTE)

CROSS REFERENCE TO RELATED APPLICATION

The present application claims priority to U.S. Provisional Patent Application No. 62/505,526, fled May 12, 2017, entitled "MEASUREMENT DESIGN FOR NEXT RADIO (NR) AND LONG TERM EVOLUTION (LTE)," the entire disclosure of which is hereby incorporated by reference.

BACKGROUND

Various embodiments generally may relate to the field of wireless communications.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

In a NR (Next Radio, otherwise known as New Radio) system, a new SS (Synchronization Signal) is introduced and the Synchronization Signal is designed to be used as cell identification, measurement and so on. The New Radio Synchronization Signal is designed as below.

A set of configuration values for synchronization signal (SS) burst set periodicity applicable for User Equipments in RRC_CONNECTED and IDLE mode that are operating in standalone New Radio cells, and for User Equipments that are operating in non-standalone New Radio cells are provided. The Synchronization Signal burst set periodicity is the frequency at which the same Synchronization Signal block is repeated. The set of configuration values for Synchronization Signal burst set periodicity may be specified as {5, 10, 20, 40, 80, and 160} ms. The maximum number (L) of Synchronization Signal blocks used may vary according to frequency. For example, there may be three groups: (1) for use with the frequency range up to 3 GHZ. L=[1, 2, 4]; (2) for use with the frequency range from 3 GHz to 6 GHZ; L=[4, 8]; (3) for use with the frequency range from 6 GHz to 52.6 GHz L=[64].

Figure 1:
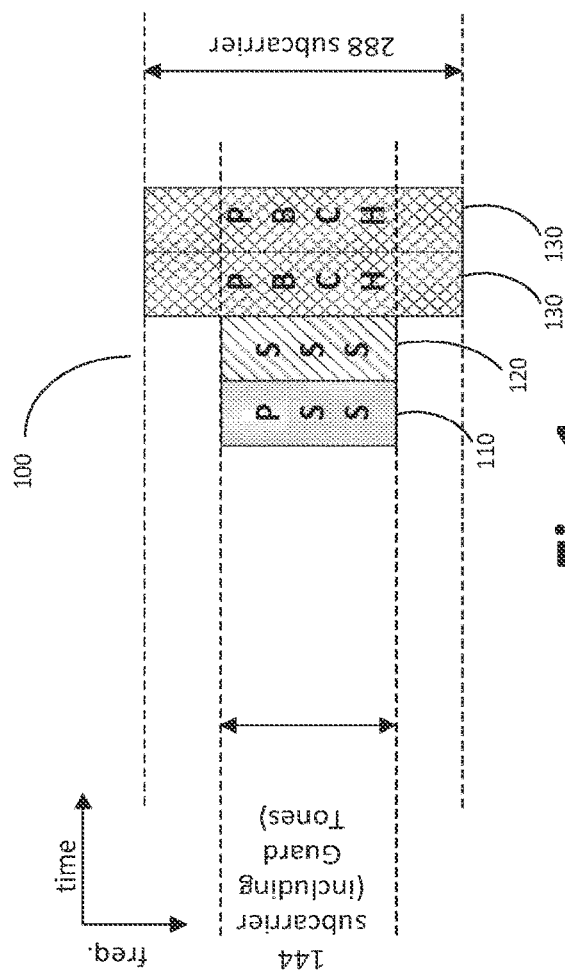
FIG. 1 shows an example structure of a Synchronization Signal (SS) block in accordance with some embodiments.

An example Synchronization Signal block 100 is shown in FIG. 1, where a Synchronization Signal block includes one symbol (i.e. OFDM symbol) of the PSS (Primary Synchronization Signal) 110, one symbol of the SSS (Secondary Synchronization Signal) 120, and two symbols for in some configurations more than two) of the PBCH (Physical Broadcast Channel) 130.

Figure 2:
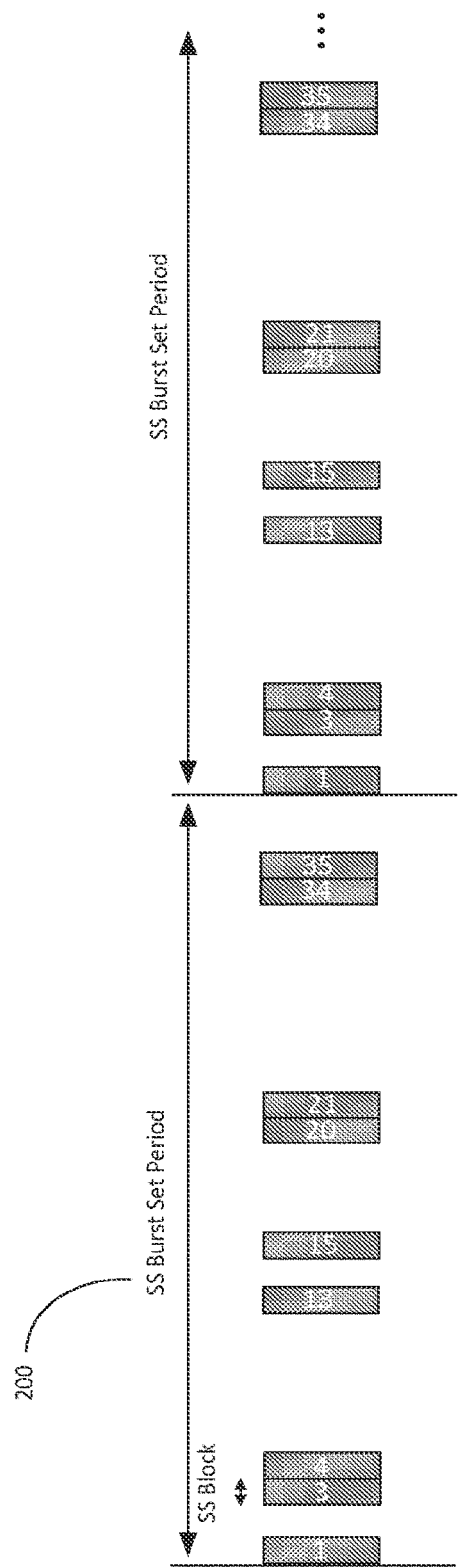
FIG. 2 shows an example Synchronization Signal burst set(s) in accordance with some embodiments.

FIG. 2 shows an example Synchronization Signal burst set(s) in accordance with some embodiments. The network can configure a bitmap to indicate which Synchronization Signal blocks are punctured (i.e. disabled) as die blank parts in the example of FIG. 2. For example, if the maximum Synchronization Signal block number is L=4 and Synchronization Signal burst set period is 5 ms and the respective bitmap indicates that no Synchronization Signal block is disabled, then ere are 4 continuous Synchronization Signal blocks in this 5 ms. However, the symbols (i.e. Physical resources) for she PDCCH (physical dedicated control channel) may not be used by the Synchronization Signal.

Since the Synchronization Signal may have different periodicity on different frequency layers or for different cells, an identical gap pattern may not be feasible for measurement, which is quite different from legacy LTE (i.e. in legacy LTE the Primary Synchronization Signal/Secondary Synchronization Signal periodicity is fixed as 5 ms and therefore a 6 ms gap can apply for all cells on all frequency layers to cover at least one Primary Synchronization Signal/ Secondary Synchronization Signal copy). The new measure a mechanism presented herein is needed to be compatible for both LTE and New Radio reference signals and cost the smallest interruption to the normal traffics.

In order to find out a compatible approach to conduct the measurement for both LTE and New Radio, multiple frequency layers and multiple Synchronization Signal block configurations shall be considered in parallel.

In Example 1 the Measurement Gap Length (MGL) in New Radio may be 6 ms.

In Example 2 the Measurement Gap Length in New Radio may be 6 ms for frequency range below 6 GHz, and, the Measurement Gap Length in New Radio may be X ms for frequency range above 6 GHz. For example X may be equal or greater than 6 ms. In such an example, if the Sub-carrier Spacing is YkHz, and two Synchronization Signal blocks are contained in one subframe, then X may be greater than $(L/2)*(15/Y)$ms for a frequency range above 6 GHz; e.g. X=9 ms. In such an example, if the Sub-carrier Spacing is YkHz, and three Synchronization Signal blocks are contained in one subframe, then X may be greater than ceiling (L/3)*(15/Y)ms for a frequency range above 6 GHz; e.g. X=6 ms. (Where the function ceiling(k) is the least integer greater than or equal to k).

Example 3 may include a bitmap for gap pattern use, and may be used to indicate the gap availability in time sequence on a frequency layer. The bitmap is used to indicate which gap occasion is available or disabled (i.e. punctured muted), e.g. "1" means gap occasion is available for measurement and "0" means that the gap occasion is disabled. For each frequency layer measurement, the network may signal assistance information to User Equipment, which may include but is not limited to: Gap periodicity (e.g. 40 ms or 80 ms); Gap offset, to indicate the position of gap duration (i.e. length) within the Gap periodicity; Measurement Gap Length; and Gap bitmap. The bitmap design may guarantee that the Measurement Gap Length in each 40 ms will not exceed 6 ms or 7 ms.

The gap resource for LTE measurement may be prioritized over New Radio measurement. For example, if the LTE measurement gap collides with the New Radio measurement gap in the time domain, then the LTE measurement may be performed first in the gap. Or, the gap resource for New Radio may be prioritized over LTE measurement. For example, if the LTE measurement gap collides with the New Radio measurement gap in the time domain, then the New Radio measurement may be performed first in the gap.

Example 4 may include the Measurement Gap Repetition Period (MGRP) or interval between every two gaps, which may be equal or greater than 40 ms even though the Synchronization Signal burst set periodicity may be smaller than 40 ms.

Embodiment 1: the measurement gap length (MGL) in New Radio may be 6 ms.

Figure 3:
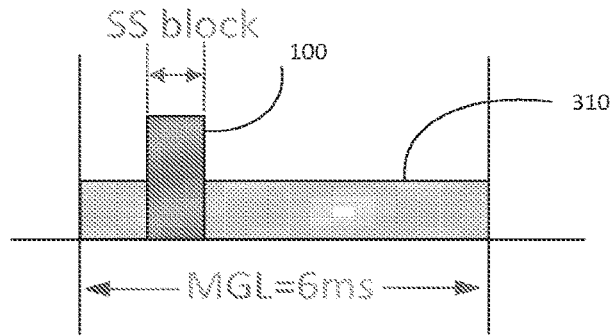
FIG. 3 shows an example of the Measurement Gap in New Radio (NR) in accordance with some embodiments.

FIG. 3 shows an example 6 ms measurement gap 310 for New Radio measurement, containing the Synchronization Signal block 100. In this example, the User Equipment will use a 6 ms gap for inter-frequency or intra-frequency measurement, and this gap may contain the Synchronization Signal blocks of New Radio for synchronization or measurement.

Embodiment 2: The Measurement Gap Length in New Radio may be 6 ms for frequency range below 6 GHz, and, the Measurement Gap Length in New Radio may be X ms for frequency range above 6 GHz. For example, X may be equal or greater than 6 ms. In such an example, if the Sub-carrier Spacing is YkHz, and two Synchronization Signal blocks are contained in one subframe, then X may be greater than (L/2)*(15/Y)ms for a frequency range above 60 GHz; X=0 ms. In such an example, if the Sub-carrier Spacing is YkHz, and three Synchronization Signal blocks are contained in one subframe, then X may be greater than ceiling(L/3)*(15/Y)ms for a frequency range above 60 Hz, e.g. X=6 ms. (Where the function ceiling(k)=is the least integer greater than or equal to k).

This calculation of Measurement Gap Length, X (ms), can be seen in a more generic form by the relationship.

$$X \geq \mathrm{ceiling}(L/n) * (15/Y)$$

where L is the maximum amount of Synchronization Signal blocks per Synchronization Signal burst set, n is the amount of Synchronization Signal blocks in one subframe, and Y (kHz) is the Sub-carrier Spacing.

For example, the maximum amount of Synchronization Signal blocks above 60 Hz might be 64 per Synchronization Signal burst set, the numerology used for Synchronization Signal above 60 Hz might be Sub-carrier Spacing (SCS): KHz (e.g. 60 KHz, 120 KHz or others), and the amount of Synchronization Signal blocks in one subframe is n (e.g. n=3 in FIG. 4, or 2 in FIG. 5, or others).

Figure 4:
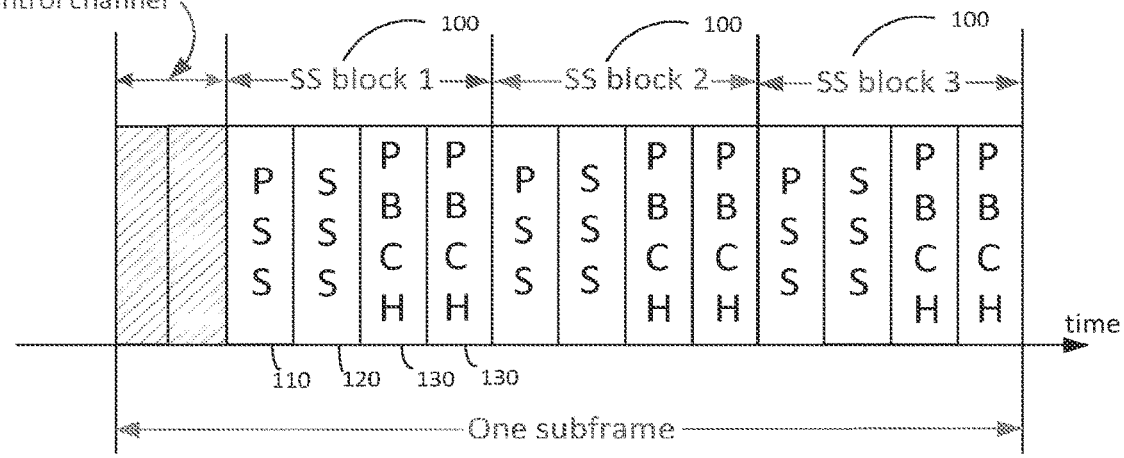
FIG. 4 shows an example of three Synchronization Signal blocks in one subframe in accordance with some embodiments.

For the example shown in FIG. 4, if three Synchronization Signal (SS) blocks 100 can be contained in one subframe, then 22 subframes are needed to contain 64 Synchronization Signal blocks above 6 GHz, and the length of 22 subframes is 22*15(kHz)/Y(kHz), so if the Sub-carrier Spacing, Y=60 KHz, the length of 22 subframes is 5.5 ms. The Measurement Gap Length may be greater than or equal to 5.5 ms, and for example a 6 ms or 7 ms Measurement Gap Length may also be feasible for this case.

Figure 5:
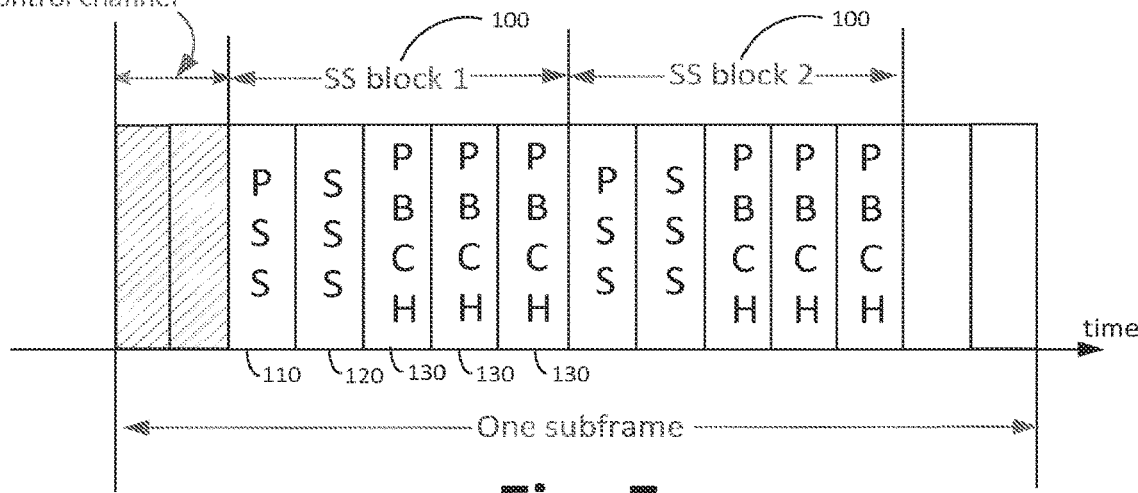
FIG. 5 shows an example of two Synchronization Signal blocks in one subframe in accordance with some embodiments.

For the example shown in FIG. 5, if two Synchronization Signal blocks can be contained in one subframe, then 32 subframes are needed to contain 64 Synchronization Signal blocks above 6 GHz, and the length of 32 subframes is 32*15(KHz)/Y(kHz); so if the Sub-carrier Spacing Y=60 kHz, the length of 32 subframes is 8 ms. The Measurement Gap Length may be greater than or equal to 8 ms, and for example the 9 ms Measurement Gap Length may also be feasible for this case.

In a further example, if four Synchronization Signal blocks can be contained in one subframe, then 16 subframes are needed to contain 64 Synchronization blocks above 6 GHz. and the length of 16 subframes is 16*15(KHz)/Y (kHz); so if the Sub-carrier Spacing Y=60 kHz, the length of 16 subframes is 4 ms. The Measurement Gap Length may be greater than or equal to 4 ms, and for example the 4 ms Measurement Gap Length may be feasible in this case.

In a further example, if five Synchronization Signal blocks can be contained in one subframe, then 13 subframes are needed to contain 64 Synchronization blocks above 6 GHz, and the length of 13 subframes is 13*15(kHz)/Y(kHz); so if the Sub-carrier Spacing Y=60 KHz, the length of 16 subframes is 3.25 ms. The Measurement Gap Length may be greater than or equal to 3.25 ms, and for example the 3.5 ms Measurement Gap Length may also be feasible in this case.

In a further example, if six Synchronization Signal blocks can be contained in one subframe, then 11 subframes are needed to contain 64 Synchronization blocks above 6 GHZ, and the length of 11 subframes is 11*15(kHz)/Y(kHz); so if the Sob-carrier Spacing Y=60 kHz, the length of 11 subframes is 2.75 ms. The Measurement Gap Length may be greater than or equal to 2.75 ms, and for example the 3 ms Measurement Gap Length may also be feasible in this case.

In a further example, if eleven Synchronization Signal blocks can be contained in one subframe, then 6 subframes are needed to contain 64 Synchronization blocks above 6 GHz, and the length of 6 subframes is 6*15(kHz)/Y(KHz); so if the Sub-carrier Spacing Y=60 KHz, the length of 6 subframes is 1.5 ms. The Measurement Gap Length may be greater than or equal to 1.5 ms, and for example the 1.5 ms Measurement Gap Length may be feasible in this case.

The foregoing examples illustrate calculation of Measurement Gap Length for situations where the Sub-carrier Spacing Y=60 kHz. The skilled person will understand that the same principles described herein are equally applicable to situations where the Sub-carrier Spacing is Y=15 kHz, Y=30 kHz, Y=120 kHz, Y=240 kHz, or any other appropriate Sub-carrier Spacing.

Embodiment 3: The bitmap for gap pattern may be used to indicate the gap availability in time sequence on a frequency layer. The bitmap is used to indicate which gap occasion is available or dis abled, e.g. "1" means gap occasion is available and "0" means gap occasion is disabled. For each frequency layer measurement, the network may signal gap assistance information to User Equipment, which may include but is not limited to: Gap periodicity (e.g. 40 ms or 80 ms); Gap offset: to indicate the position of gap duration within the Gap periodicity; Measurement Gap Length; Gap bitmap. The bitmap design may guarantee that the Measurement Gap Length in each 40 ms will not exceed 6 ms or 7 ms. For example, in the example displayed in FIG. 6, the bitmap for the measurement gap applied on frequency layer F1 is 1100. The bitmap for the measurement gap applied on frequency layer F2 is 0011. Therefore, over the time period displayed in FIG. 6, the gap applied on this UE will not exceed 6 ms or 7 ms. However, if the measurement gap pattern on frequency layer F1 is 1100 and the bitmap for the measurement gap pattern on frequency layer F2 is instead 1011, then over the time period displayed in FIG. 6 the applied gap will exceed 6 ms or 7 ms per 40 ms in statistic, because the first gap will be enabled on both frequency layers F1 and F2.

The gap resource for LTE measurement may be prioritized over New Radio measurement. For example, if the LTE measurement gap collides with the New Radio measurement gap in the time domain, then the LTE measurement may be performed first in the gap. Or, the gap resource for New Radio may be prioritized over LTE measurement. For example, if the LTE measurement gap collides with the New Radio measurement gap in the time domain, then the New Radio measurement may be performed first in the gap.

Figure 6:
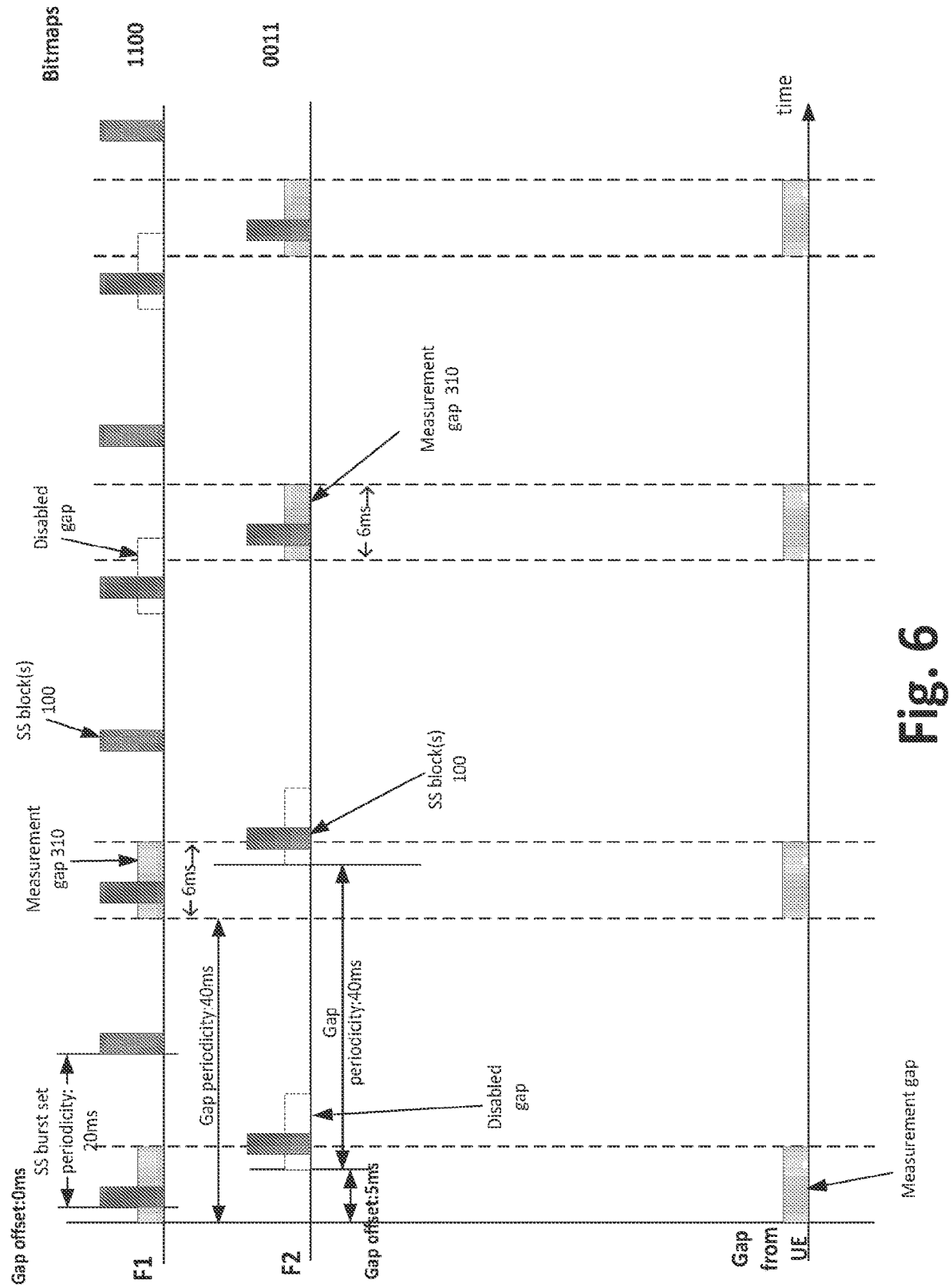
FIG. 6 shows an example for gap configuration among different frequency layers in New Radio (NR) networks in accordance with some embodiments.

The example in FIG. 6 shows the use of two frequency layers (F1 and F2) for New Radio measurements (i.e. no legacy LTE frequency layers are in use). In this example the F1 gap assistance information is:

Gap periodicity: 40 ms (i e, the time interval between the start of two possible gaps, also referred to as the frequency of the gaps).

Gap offset: 0 ms (i.e. the start position of a gap in the gap periodicity).

Measurement Gap Length: 6 ms (i.e. gap duration length).

Gap bitmap: 1100 (i.e. the first and second gap occasions are available for User Equipment to perform measurement on F1, but the third and fourth gap occasions are disabled. Therefore, User Equipment cannot perform measurement on F1 in the third and fourth gap occasion for F1).

And, in this example, the assistance information is:

Gap periodicity: 40 ms (i.e. the time interval between the start of two possible gaps).

Gap offset: 5 ms (i.e. the start position of a gap in the gap periodicity).

Measurement Gap Length: 6 ms (i.e. gap duration length).

Gap bitmap: 0011 (i.e. the third and fourth gap occasions are available for User Equipment to perform measurement on F2, but the first and second gap occasions are disabled. Therefore, User Equipment cannot perform measurement on F2 in the first and second gap occasions for F2).

So, from a User Equipment perspective, the interval between every two gaps may not be identical. But this per-User Equipment gap can be used for LTE network measurement, since the Primary Synchronization Signal/Secondary Synchronization Signal in LTE is always available in every 5 ms.

If there is an LTE-specific F3 used on top of the example in FIG. 6, then the LTE gap periodicity is 40 ms, and gap offset is 5 ms and Measurement Gap Length is 6 ms. That means the gap pattern for LTE cells on F3 is same as New Radio cells on F3, then there may be two implementations for User Equipment: In one implementation, User Equipment may prioritize LTE measurement over New Radio measurement, then the third and fourth gaps for F2 may be muted as well; In an alternative implementation, User Equipment may prioritize New Radio measurement over LTE measurement, then the third and fourth gaps for F2 can be used for F2 New Radio cells measurement.

Figure 7:
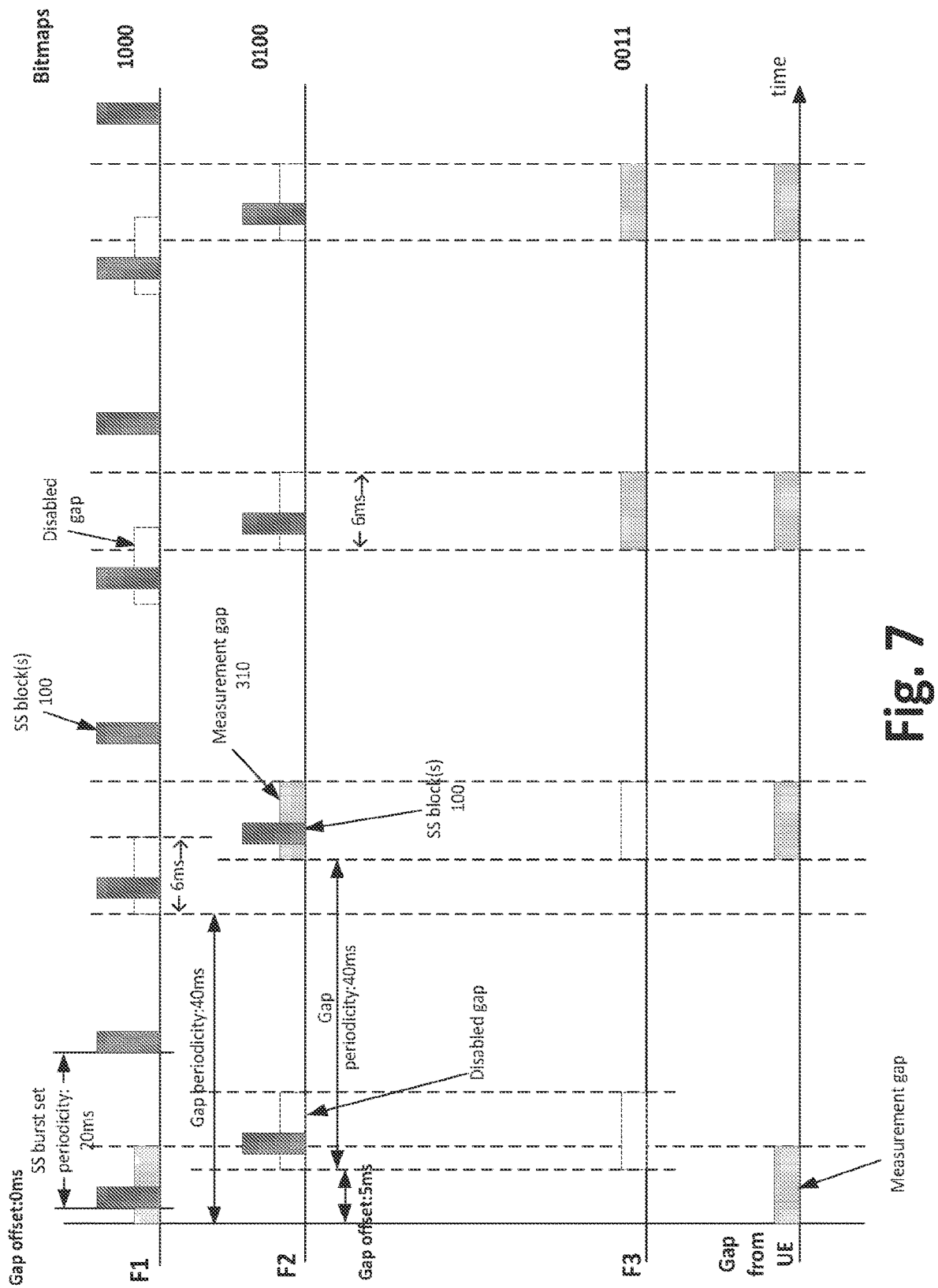
FIG. 7 shows an example for gap configuration among different frequency layers in both New Radio (NR) and Long-Term Evolution (LTE) networks in accordance with some embodiments.

The example in FIG. 7 shows the use of three frequency layers (F1, F2 and F3): two for New Radio measurements (F1, F2) and one LTE measurement (F3). New Radio cells are on frequency layers F1 and F2, and LTE cells are on frequency layer F3. In this example, the F1 gap assistance information is:

Gap periodicity: 40 ms (i, e, the time interval between the start of two possible gaps).

Gap offset: 0 ms (i.e. the start position of a gap in the gap periodicity).

Measurement Gap Length: 6 ms (i.e. gap duration length).

Gap bitmap: 1000 (Le only the first gap occasion is available for User Equipment to perform measurement on F1, but the other three gap occasions on F1 are disabled. Therefore, User Equipment cannot perform measurement on F1 in the second, third and fourth gap occasions for F1).

And, in this example, the F2 gap assistance information is:

Gap periodicity: 40 ms (Le, the time interval between the start of two possible gaps).

Gap offset: 5 ms (i.e. the start position gap periodicity).

Measurement Gap Length: 6 ms (i.e. gap duration length)

Gap bitmap: 0100 (i.e. only the second gap occasion is available for User Equipment to perform measurement on F2, but the other gap occasions on F2 are disabled. Therefore, User Equipment cannot perform measurement on F2 in the first, third and fourth gap occasions for F2).

And, in this example the F3 gap assistance information is:

Gap periodicity: 40 ms (i.e. the time interval between the start of two possible gaps).

Cap offset: 3 ms (i.e. the start position of a gap in the gap periodicity).

Measurement Gap Length: 6 ms (i.e. gap duration length).

Gap bitmap: 0011 (i.e. only the third and fourth gap occasions are available for User Equipment to perform LTE measurement on F3, but the other gap occasions on F3 are disabled. Therefore, User Equipment cannot perform measurement on F3 in the first and second gap occasions for F3).

So, from a User Equipment perspective, the interval between every two gaps may be not identical. But this per-User Equipment gap can be used for LTE network measurement, since the Primary Synchronization Signal/Secondary Synchronization Signal in LTE is always available in every 5 ms.

Although the foregoing examples in FIG. 6 and FIG. 7 demonstrate situations with two and three frequency layers, it will be apparent to persons skilled in the art that the same principles can be extended to a larger number of frequency layers. Equally, the selection of frequencies within given ranges can be varied without fundamentally changing the principles described herein. Equally, the length of the bitmap may vary from the 4-bit example shown and persons skilled in the art will understand that a bitmap of any length is possible without changing the principles described herein.

Embodiment 4: The Measurement Gap Repetition Period (MGRP) or interval between every two gaps may be equal or greater than 40 ms even though the Synchronization Signal burst set periodicity may be smaller than 40 ms.

The Measurement Gap Repetition Period (also referred to as gap periodicity) and interval between every two gaps (also referred to as gap interval) may not equal, as shown in the examples in FIG. 6 and FIG. 7, but this Measurement Gap Repetition Period and interval may be always equal or greater than 40 ms. Looking at FIG. 6, the Measurement Gap Repetition Period is determined by the gap pattern for each individual frequency layer (i.e. on an individual frequency, e.g. F1, the Measurement Gap Repetition Period is fixed, e.g. 40 ms). The gap interval however is the actual time interval between the start of two applied gaps from a per-UE view, for example the time line "gap from UE" in FIG. 6, which is not fixed to 40 ms.

In order to make sure the impact to normal data traffic is as low as possible, the gap occupation time ratio should be aimed to be smaller than 6/40=15% or 7/40=17.5%. So Measurement Gap Length cannot be more than 6 ms or 7 ms for below 6 GHz.

Figure 8:
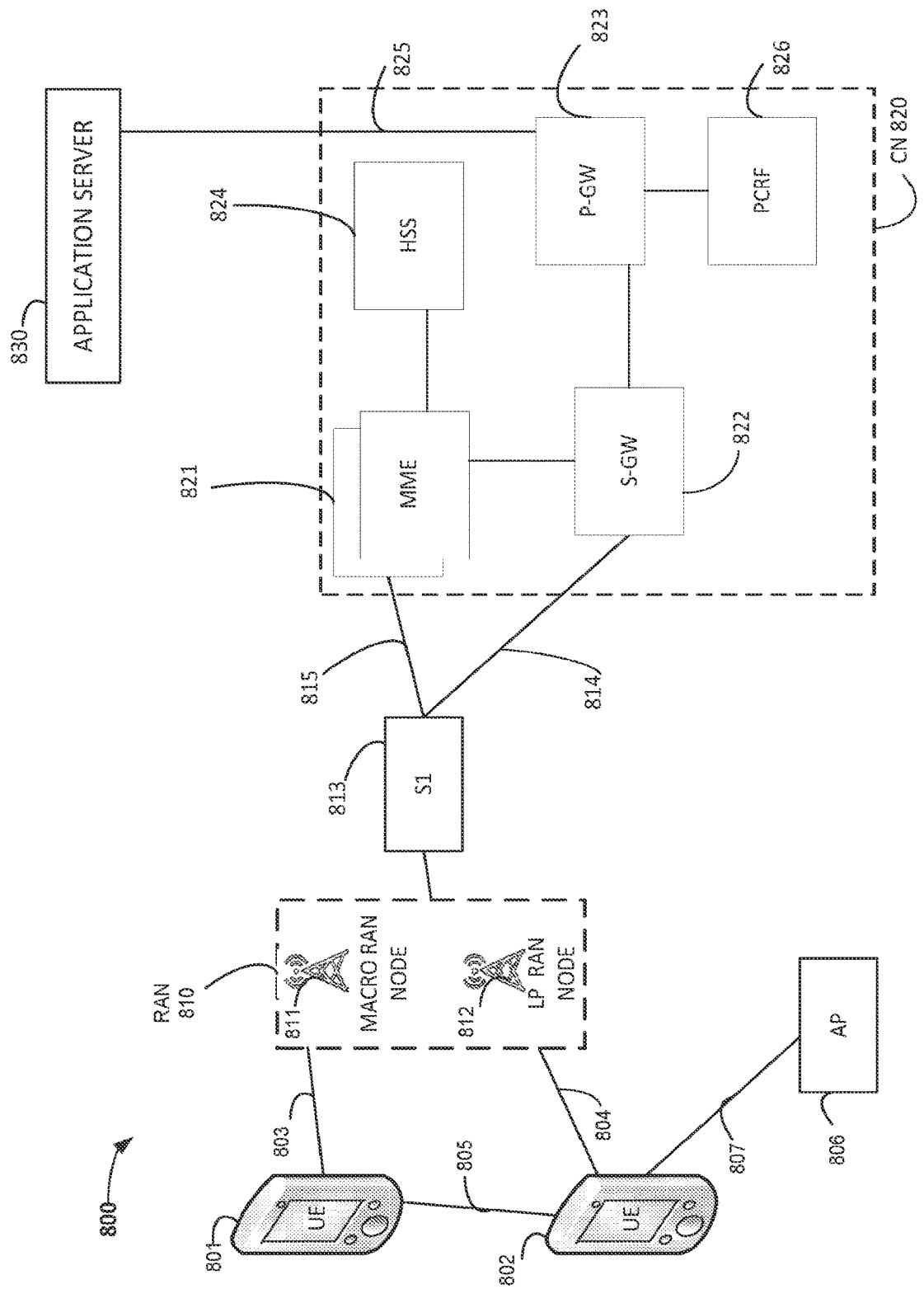
FIG. 8 shows an architecture of a system of a wireless network in accordance with some embodiments.

FIG. 8 illustrates an architecture of a system 800 of a network in accordance with some embodiments. The system 500 is shown to include a user equipment (UE) 801 and a UE 802. The UEs 801 and 802 are illustrated as smartphones (e.g., handheld touchscreen mobile computing device connectable to one or more cellular networks), but may also comprise any mobile or non-mobile computing device, such as Personal Data Assistants (PDAs), pagers, laptop computers, desktop computers, wireless handsets, or any computing device including a wireless communication interface.

In some embodiments, any of the UEs 801 and 802 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 801 and 802 may be configured to connect, e.g., communicatively couple, with a radio access network (RAN) 810—the RAN 810 may be, for example, an Evolved Universal Mobile Telecommunications System (UMTS) Terrestrial Radio Access Network (E-UTRAN), a NextGen RAN (NG RAN), or some other type of RAN. The UEs 801 and 02 utilize connections 803 and 804, respectively, each of which comprises a physical communications interface or layer (discussed in further detail below); in this example, the connections 803 and 804 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 801 and 802 may further directly exchange communication data via a ProSe interface 805. The ProSe interface SOS may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 802 is shown to be configured to access an access point (AP) 806 via connection 807. The connection 807 can comprise a local wireless connection, such as a connection consistent with any IEEE 802.11 protocol, wherein the AP 806 would comprise a wireless fidelity (WiFi®) router. In this example, the AP 806 is shown to be connected to the Internet without connecting to the core network of the wireless system (described in further detail below).

The RAN 810 can include one or more access nodes that enable the connections 803 and 804. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 810 may include one or more RAN nodes for providing macrocells macro RAN node 811, and one or more RAN nodes for providing femtocells or picocells (e.g., cells having smaller coverage areas, smaller user capacity, or higher bandwidth compared to macrocells), e.g., low power (LP) RAN node 812.

Any of the RAN nodes 811 and 812 can terminate the air interface protocol and can be the first point of contact for the UEs 801 and 802. In some embodiments, any of the RAN nodes 811 and 812 can fulfill various logical functions for the RAN 810 including, but not limited to, radio network controller (RNC) functions such as radio bearer management, uplink and downlink dynamic radio resource management and data packet scheduling, and mobility management.

In accordance with some embodiment, the UEs 801 and 802 can be configured to communicate using Orthogonal Frequency-Division Multiplexing (OFDM) communication signals with each other or with any of the RAN nodes 811 and 812 over a multicarrier communication channel in accordance communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 811 and 812 to the UEs 801 and 802, while uplink transmissions can utilize similar techniques. The grid can be a time-frequency grid, called a resource grid of time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Bach resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 801 and 802. The physical downlink control channel (PDCCH) may carry information about the transport format and resource allocations related to the PDSCH channel, among other things. It may also inform the UEs 801 and 802 about the transport format, resource allocation, and H-ARQ (Hybrid Automatic Repeat Request) information related to the uplink shared channel. Typically, downlink scheduling (assigning control and shared channel resource blocks to the UE 802 within a cell) may be performed at any of the RAN nodes 811 and 812 based on channel quality information fed back from any of the UEs 801 and 802. The downlink resource assignment information may be sent on the PDCCH used for (e.g., assigned to) each of the UEs 801 and 802.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g. aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 810 is shown to be communicatively coupled to a core network (CN) 820 . . . via an S1 interface 813. In embodiments, the CN 820 may be an evolved packet core (EPC) network, a NextGen Packet Core (NPC) network, or some other type of CN. In this embodiment the S1 interface 813 is split into two parts: the S1-U interface 814, which carries traffic data between the RAN nodes 811 and 812 and the serving gateway (S-GW) 822, and the S1-mobility management entity (MME) interface 815, which is a signaling interface between the RAN nodes 811 and 812 and MMEs 821.

In this embodiment, the CN 820 comprises the MMEs 821, the S-GW 822, the Packet Data Network (PDN) Gateway (P-GW) 823, and a home subscriber server (HSS) 824. The MMEs 821 may be similar in function to the control plane of legacy Serving General Packet Radio Service (GPRS) Support Nodes (SGSN). The MMEs 821 may manage mobility aspects in access such s gateway selection and tracking area list management. The HSS 824 may comprise a database for network users, including subscription-related information to support the network entities handling of communication sessions. The CN 820 may comprise one or several HSSs 824, depending on the number of mobile subscribers the capacity of the equipment, on the organization of the network, etc. For example, the HSS 824 can provide support for routing/roaming, authentication, authorization, naming/addressing resolution, location dependencies, etc.

The S-GW 822 may terminate the S1 interface 813 towards the RAN 810, and routes data packets between the RAN 810 and the CN 820. In addition, the S-GW 822 may be a local mobility anchor point for inter-RAN node handovers and also may provide an anchor for inter-3GPP mobility. Other responsibilities may include lawful intercept, charging, and some policy enforcement.

The P-GW 823 may terminate an SGi interface toward a PDN. The P-GW 823 may route data packets between the EPC network 823 and external networks such as a network including the application server 830 (alternatively referred to as application function (AF) via an Internet Protocol (IP) interface 825. Generally, the application server 830 may be an element offering applications that use IP bearer resources with the core network (e.g., UMTS Packet Services (PS) domain, LTE PS data services, etc.). In this embodiment, the P-GW 823 is shown to be communicatively coupled to an a n server 830 via an IP communications interface 825. The application server 830 can also be configured to support one or more communication services (e.g., Voice-over-Internet Protocol (VoIP) sessions, PTT sessions, group communication sessions, social networking services, etc.) for the UEs 801 and 802 via the CN 820.

The P-GW 823 may further be a node for policy enforcement and charging data collection. Policy and Charging Enforcement Function (PCRF) 826 is the policy and charging control element of the CN 820. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 826 may be communicatively coupled to the application server 830 via the P-GW 823. The application server 830 may signal the PCRF 826 to indicate a new service flow and select the appropriate Quality of Service (QoS) and charging parameters. The PCRF 826 may provision this rule into a Policy and Charging Enforcement Function (PCEF) (not shown) with the appropriate traffic flow template (TFT) and QoS class of identifier (OCI), which commences the QoS and charging as specified by the application server 830.

Figure 9:
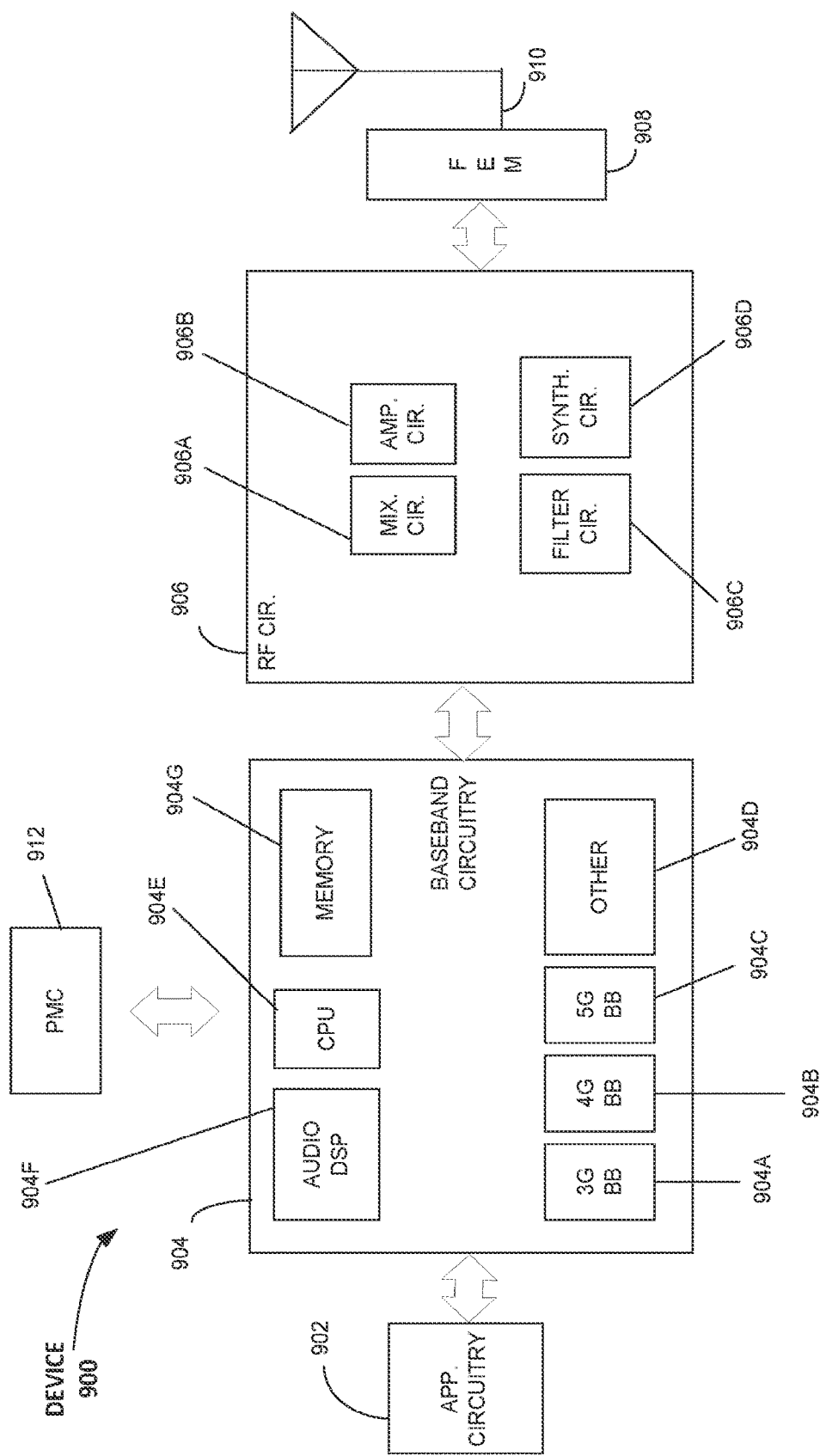
FIG. 9 shows example components of a device in accordance with some embodiments.

FIG. 9 illustrates example components of a device 900 in accordance with some embodiments. In some embodiments, the device 900 may include application circuitry 902, baseband circuitry 904. Rad Frequency (RF) circuitry 906, front-end module (FEM) circuitry 908, one or more antennas 910, and power management circuitry (PMC) 912 coupled together at least as shown. The components of the illustrated device 900 may be included in a UE or a RAN node. In some embodiments, the device 900 may include less elements (e.g., a RAN node may not utilize application circuitry 902, and instead include a processor/controller to process IP data received from an BPC). In some embodiments, the device 900 may include additional elements such as, for example, memory/storage, display, camera, sensor, or input/output (I/O)) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with of may include memory/storage and may be configured to execute instructions stored in the memory/storage to enable various applications or operating systems to run on the device 900. In some embodiments, processors of application circuitry 902 may process IP data packets received from an EPC The baseband circuitry 904 may include circuitry such as, but not limited to, one or more single-core or multi-core processors. The baseband circuitry 904 may include one or more baseband processors or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 204 may include a third generation (3G) baseband processor 904A, a fourth generation (4G) baseband processor 904B, a fifth generation (5G) baseband processor 204C, or other baseband processor(s) 904D for other existing generations, generations in development or to be developed in the future (e.g. second generation (2G), sixth generation (6G), etc.). The baseband circuitry 904 (e.g., one or more of baseband processors XT04A-D) may handle various radio control functions that enable communication with one or more radio networks via the RF circuitry 906. In other embodiments, some or all of the functionality of baseband processors 904A-D may be included in modules stored in the memory 9040 and executed via a Central Processing Unit (CPU) 904E. The radio control functions may include, but are not limited to, signal modulation/demodulation, encoding/decoding, radio frequency shilling, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include one or more audio digital signal processor(s) (DSP) 904F. The audio DSP(s) 904F may be include elements for compression decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) or other wireless metropolitan area network (WMAN), a wireless local area network (WLAN), a wireless personal area network (WPAN). Embodiments in which the baseband circuitry 904 is configured to support radio communications of more than one wireless protocol may be referred to as multi-mode baseband try.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RE signals received from the FEM circuitry 908 and provide baseband signals to the baseband circuitry 904. RE circuitry 906 may also include a transmit signal path which may include circuitry to up-convert baseband signals provided by the baseband circuitry 904 and provide RF output signals to the FEM circuitry 908 for transmission.

In some embodiments, the receive signal path of the RE circuitry 906 may include mixer circuitry 906a, amplifier circuitry 906b and filter circuitry 906c. In some embodiments, the transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c.

In some embodiments, the mixer circuitry 906a of the receive signal path and the mixer circuitry 906a of the transmit signal path may include two or more mixers and may be arranged for quadrature downconversion and upconversion, respectively. In some embodiments, the mixer circuitry 90 of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct downconversion and direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 90G.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In one embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pomp and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910. In various embodiments, the amplification through the transmit or receive signal paths may be done solely in the RF circuitry 906, solely in the FEM 908, or in both the RF circuitry 906 and the FEM 908.

In some embodiments, the FEM circuitry 908 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910).

In some embodiments, the PMC 912 may manage power provided to the baseband circuitry 904. In particular, the PMC 912 may control power-source selection, voltage scaling, battery charging, or DC-to-DC conversion. The PMC 912 may often be included when the device 900 is capable of being powered by a battery, for example, when the device is included in a UE. The PMC 912 may increase the power conversion efficiency while providing desirable implementation size and heat dissipation characteristics.

While FIG. 9 shows the PMC 912 coupled only with the baseband circuitry 904. However, in other embodiments, the PMC 912 may be additionally or alternatively coupled with, and perform similar power management operations for, other components such as, but not limited to, application circuitry 902, RF circuitry 906, or FEM 908.

In some embodiments, the PMC 912 may control, or otherwise be part of, various power saving mechanisms of the device 900. For example, if the device 900 is in an RRC_Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC_Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used execute Layer 3, Layer 2, or Layer 1 functionality, while processors of the application circuitry 904 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
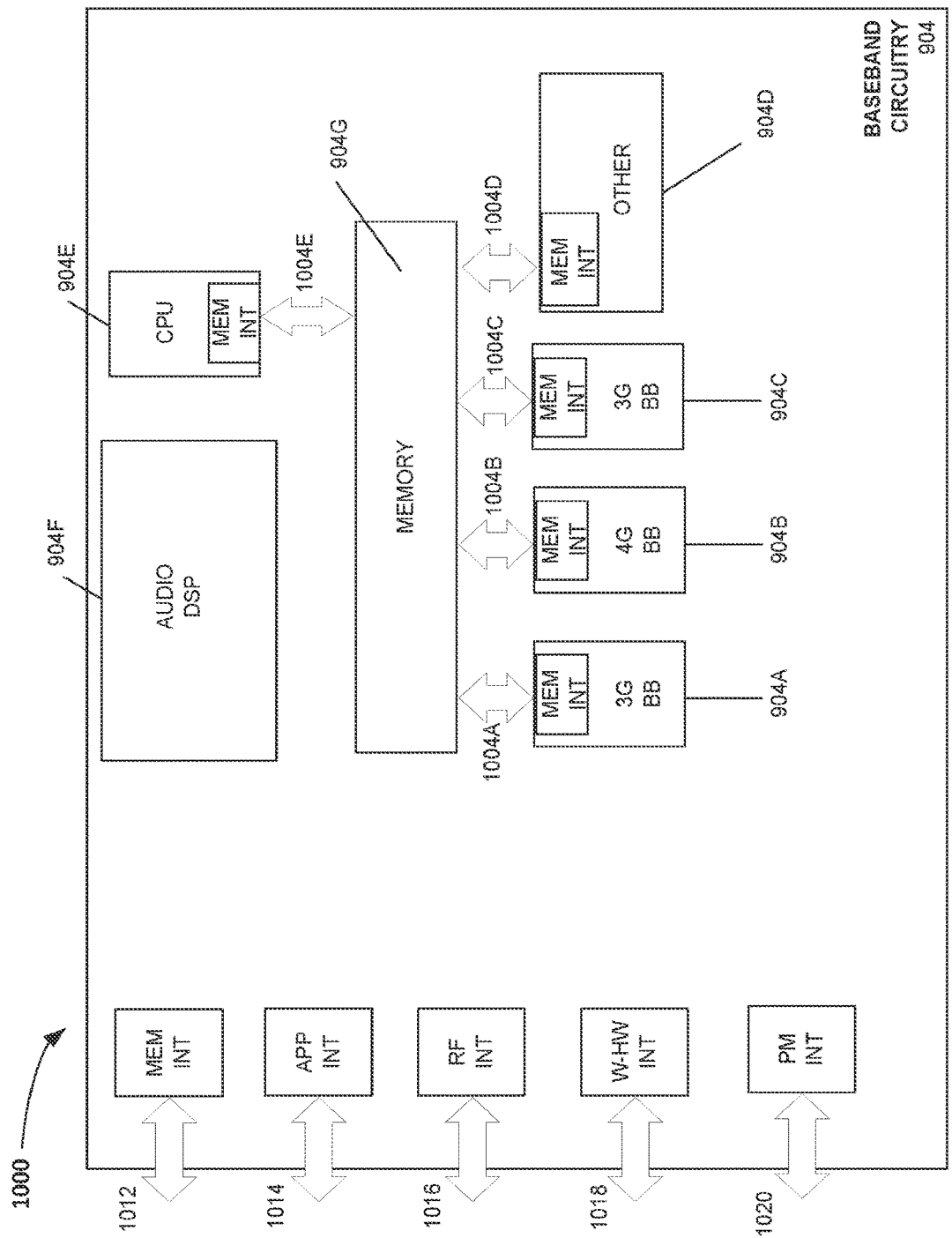
FIG. 10 shows example interfaces of baseband circuitry in accordance with some embodiments.

FIG. 10 illustrates example interfaces of baseband circuitry in accordance with some embodiments. As discussed above, the baseband circuitry 904 of FIG. 9 may comprise processors 904A-904E and a memory 904G utilized by said processors. Each of the processors 904A-904E may include a memory interface, 1004A-1004E, respectively, to send/receive data to/from the memory 904G.

The baseband circuitry 904 may further include one or more interfaces to communicatively couple to other circuitries/devices, such as a me interface 1012 (e.g., an interface to send/receive data to/from memory external to the baseband circuitry 904), an application circuitry interface 1014 (e.g., an interface to send/receive data to/from the application circuitry 902 of FIG. 9), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components. Bluetooth® components (e.g., Bluetooth® Low Energy), Wi-Fi® components, and other communication components), and a power management interface 1020 (e.g., an interface to send/receive power of control signals to/from the PMC 912).

Figure 11:
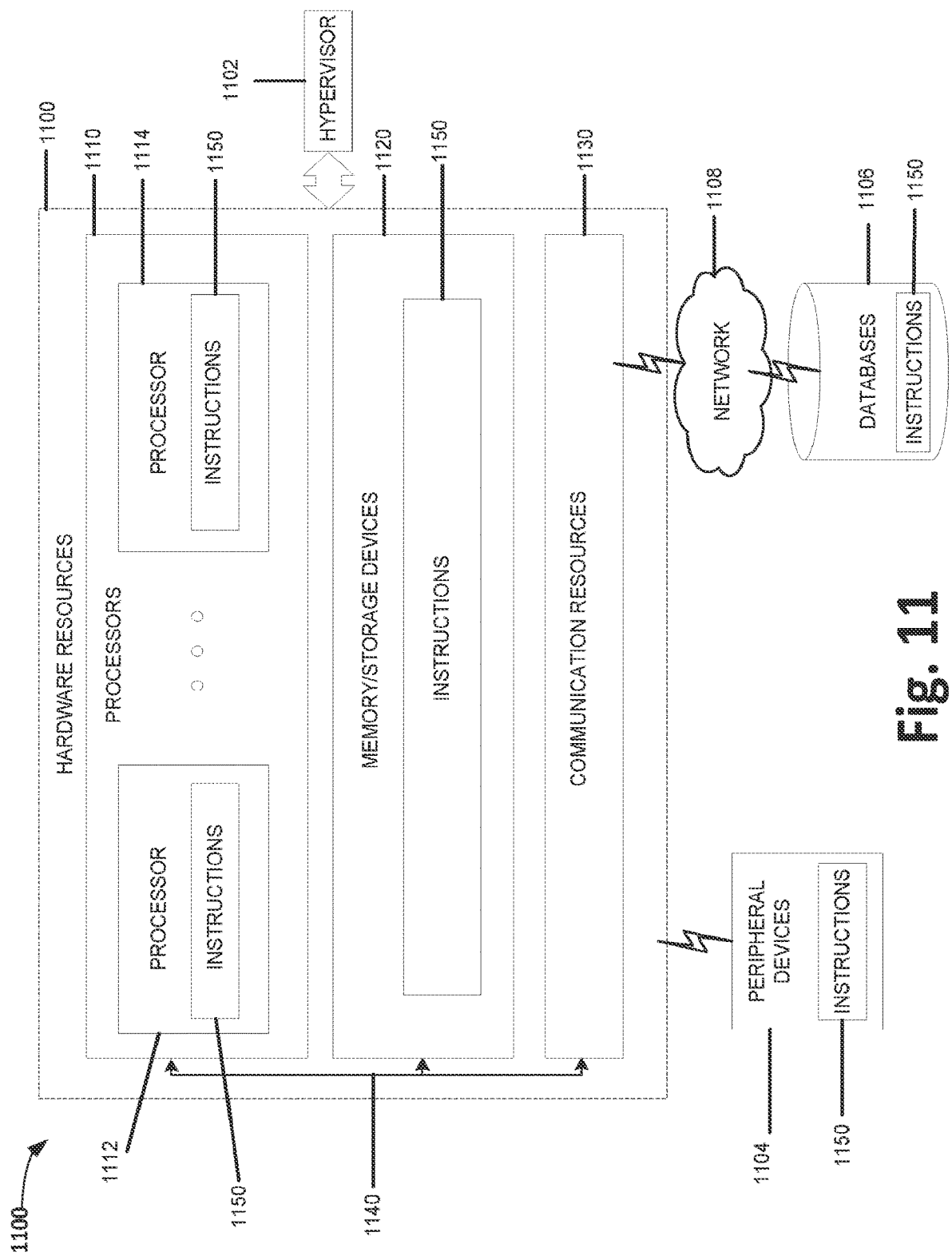
FIG. 11 shows a block diagram illustrating components in accordance with some embodiments.

FIG. 11 is a block diagram illustrating components, according to some example embodiments, able to read instructions from a machine-readable or compute able medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100.

The processors 1110 (e.g., a central processing unit (CPU), a reduced instruction set computing (RISC) processor, a complex, instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1112 and a processor 1114.

The memory/storage devices 1120 may include main memory, disk storage, or any suitable combination thereof. The memory/storage devices 1120 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via a Universal Serial Bus (USB)), cellular communication components, NFC components, Bluetooth® components (e.g., Bluetooth® Low Energy), Wi-Fi components, and other communication components.

Instructions 1150 may comprise software, a program, an application, an applet, an app, or other executable code for causing at least any of the processors 1110 to perform any one of more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

In some embodiments, the electronic device(s), network (s), system(s), chip(s) or component(s), or portions or implementations thereof, of FIGS. 1 to 11 herein may be configured to perform one or more processes, techniques, or methods as described herein, or portions thereof.

Features of various embodiments of the invention are described in the following examples, which may be combined in various combinations, according to the circumstances of each implementation.

Example 1 may include the measurement gap length (MGL) in New Radio may be 6 ms.

Example 2 may include the measurement gap length in New Radio may be 6 ms for frequency range below 6 GHz, and, the measurement gap length in New Radio may be X ms Ba frequency range above 6 GHz, X may be equal or greater than 6 ms. If Sub-carrier Spacing is YkHz, and two Synchronization Signal blocks are contained in one subframe, then X may be greater than $(L/2)*(15/Y)$ms for above 60 GHz,; e.g. X=9 ms. If Sub-carrier Spacing is YkHz, and three Synchronization Signal blocks are contained in one subframe, then X may be great than ceiling$(L/3)*(15/Y)$ms for above 6 GHZ; X=6 ms. (Where ceiling(k)=is the least integer greater than or equal to k). In some examples, the frequency boundaries involved may be the frequency boundary of the Frequency ranges specified in the standards. For example. Frequency Range 1, Frequency Range 2, and the like.

Example 3 may include the bitmap for gap pattern may be used to indicate the gap availability in time sequence on a frequency layer. Bitmap is used to indicate which gap occasion is available or punctured/muted, e.g. "1" means gap occasion is available and "0" means gap occasion is punctured or muted. For each frequency layer measurement, NW may signal assistance information to UE, which may include but not limit to: Gap periodicity (e.g. 40 ms or 80 ms), Ga offset (to indicate the position of gap duration within the Gap periodicity), Measurement Gap Length, Gap bitmap. The bitmap design may guarantee that the Measurement Gap Length in each 40 ms will not exceed 6 ms or 7 ms. The gap resource for LTE may be prioritized than New Radio measurement, LTE measurement gap is collided with New Radio measurement gap in time domain, the LTE measurement may be performed first in the gap. Or, the gap resource for New Radio may be prioritized than LTE measurement. LTE measurement gap is collided with New Radio gap in time domain, the New Radio measurement may be performed first in the gap.

Example 4 may include the Measurement Gap Repetition Period (MGRP) or interval between every two gaps may be equal or greater than 40 ms even though the Synchronization Signal burst set periodicity may be smaller than 40 ms.

Example 5 may include an apparatus comprising means to perform one or more elements of a method described in or related to any of examples 1 to 4, or any other method or process described herein.

Example 6 may include one or more non-transitory computer-readable media comprising instructions to cause an electronic device, upon execution of the instructions by one or more processors of the electronic device, to perform one or more elements of a method described in or related to any of examples 1 to 4, or any other method or process described herein.

Example 7 may include an apparatus comprising logic, modules, or circuitry to perform one or more elements of a method described in or related to any of examples 1 to 4, or any other method or process described herein.

Example 8 may include a method, technique, or process as described in or related to any of examples 1 to 4, or portions or parts thereof.

Example 9 may include an apparatus comprising: one or more processors and one or more computer readable media comprising instructions that, when executed by the one or more processors, cause the one or more processors to perform the method, techniques, or process as described in or related to any of examples 1 to 4, or portions thereof, or any other example described herein.

Example 10 may include a signal as described in or related to any of examples 1 to 4, or portions of parts thereof.

Example 11 may include a signal in a wireless network as shown and described herein.

Example 12 may include a method of communicating in a wireless network as shown and described herein.

Example 13 may include a system for providing wireless communication as shown and described herein.

Example 14 may include a device for providing wireless communication as shown and described herein.

Example 15, which may include the subject matter of any of examples 1 to 4 or any other method or process described herein, may further comprise a method of determining Measurement Gap Length for a frequency layer wherein for carrier frequencies in the frequency range below 6 GHz the Measurement Gap Length is 6 ms; and for carrier frequencies in the frequency range above 6 GHz the Measurement Gap Length is Xms, where X is governed by the relationship $X \geq \text{ceiling}(L/n)*(15/Y)$, where L is a maximum amount of Synchronization Signal blocks that can be contained in a single Synchronization Signal burst set, n is a amount of Synchronization Signal blocks in one subframe, and Y (kHz) is a Sub-carrier Spacing of the frequency layer.

Example 16, which may include the subject matter of example 13 or any other method or process described herein, may further comprise setting the Measurement Gap Length to at least 8 ms if the frequency layer has a carrier frequency in the frequency range above 60 Hz and the frequency layer has a sub-carrier s acing of 60 KHz and an amount of Synchronization Signal blocks that can be contained in subframe of the frequency layer is 2.

Example 17, which may include the subject matter of examples 15 or 16 or any other method or process described herein, may further comprise setting the Measurement Gap Length to at least 5.5 ms if the frequency layer has a carrier frequency in the frequency range above 6 GHz and the frequency layer has a sub-carrier spacing of 60 KHz and the amount of Synchronization Signal blocks that can be contained in one subframe of the frequency layer is 3.

Example 18, which may include the subject matter of any of examples 15 to 17 or any other method or process described herein, may further comprise setting the Measurement Gap Length to at least 3.5 ms if the frequency layer has a carrier frequency in the frequency range above 6 GHz and the frequency layer has a sub-carrier spacing of 60 kHz and the amount of Synchronization Signal blocks that can be contained in one subframe of the frequency layer is 5.

Example 19, which may include the subject matter of any of examples 15 to 18 or any other method or process described herein, may further comprise setting the Measurement Gap Length to at least 3 ms if the frequency layer has a carrier frequency in the frequency range above 6 GHz and the frequency layer has a sub-carrier spacing of 60 KHz and the amount of Synchronization Signal blocks that can be contained in one subframe of the frequency layer is 6.

Example 20, which may include the subject matter of any of examples 15 to 19 or any other method or process described herein, may further comprise setting the Measurement Gap Length to at least 1.5 ms if the frequency layer has a carrier frequency in the frequency range above 6 GHZ and the frequency layer has a sub-carrier spacing of 60 KHz and the amount of Synchronization Signal blocks that can be contained in one subframe of the frequency layer is 11.

Example 21, which may include the subject matter of any of examples 15 to 20 or any other method of process described herein, may further comprise determining a gap bitmap for a frequency layer of a plurality of frequency layers to indicate a gap availability in time sequence on the frequency layer, wherein the bitmap is used to indicate which gap occasion is available or disabled.

Example 22, which may include the subject matter of any of examples 15 to 21 or any other method or process described herein, may further comprise signaling gap assistance information to a User Equipment, wherein the gap assistance information comprises at least a gap periodicity, a gap offset, a measurement gap length and the determined gap bitmap.

Example 23, which may include the subject matter of any of examples 15 to 22 or any other method or process described herein, may further comprise determining a Measurement Gap Repetition Period for a frequency layer of a plurality of frequency layers, wherein the Measurement Gap Repetition Period is at least 40 ms, and wherein a Synchronization Signal burst set periodicity for the frequency layer is less than 40 ms.

Example 24, which may include the subject matter of any of examples 15 to 23 or any other method or process described herein, may further comprise determining an interval between two gaps of a plurality of gaps for a frequency layer of a plurality of frequency layers, wherein the interval between the two gaps is at least 40 ms, and wherein a Synchronization Signal burst set periodicity for the frequency layer is less than 40 ms.

Example 25, which may include the subject matter of any of examples 1 to 24 or any other method or process described herein, may further comprise determining a number of subframes required to contain a maximum number of one or more Synchronization Signal blocks, determining a time taken for the network to send the determined number of subframes required to contain the maximum number of the Synchronization Signal blocks; and setting the Measurement Gap Length to a length of time that is greater than the determined time taken to send the determined number of subframes.

Example 26 may provide an apparatus in a base station for performing a method of cell measurement in a wireless network, wherein the wireless network comprises a plurality of New Radio frequency layers, the apparatus configured to: determine a Measurement Gap Length, MGL, for each one of a plurality of frequency layers operational in the wireless network; determine a gap bitmap to indicate a measurement gap availability in a time sequence for each one of the plurality of frequency layers of the wireless network, and transmit gap assistance information for each one of the plurality of frequency layers of the wireless network to a User Equipment, wherein the gap assistance information comprises at least the determined Measurement Gap Length and the determined gap bitmap.

Example 27, which may include the subject matter of example 26 or any other method or process described herein, may further comprise the apparatus configured to determine a number of subframes required to contain a maximum number of one or more Synchronization Signal blocks; and set the Measurement Gap Length to a length of time longer than a time duration taken to send the number of subframes required to contain the maximum number of the one or more Synchronization Signal blocks.

In Example 28, which may include the subject matter of example 27 or any other method or process described herein, the maximum number of the one or more Synchronization Signal blocks for a frequency layer of the plurality of frequency layers is a predefined parameter, L, determined based on a carrier frequency of the frequency layer.

In Example 29, which may include the subject matter of example 28 or any other apparatus, method or process described herein, the determined Measurement Gap Length is X ms, determined using the equation: $X \geq ceiling(L/n) * (15/Y)$; wherein L is a maximum number of Synchronization Signal blocks per Synchronization Signal burst set, n is a number of Synchronization Signal blocks in one subframe and Y is the Sub-carrier Spacing in kHz. In some examples, the determination of the MGL is dependent on the Frequency Range in use with the MGL. For example, in some examples, L is categorized into three groups, comprising: (1) frequencies up to 3 GHZ, L=[1, 2, 4]; (2) frequencies from 3 GHz to 6 GHz, L=[4, 8]; (3) frequencies from 6 GHz to 52.6 GHZ, L=[64].

In Example 30, which may include the subject matter of any of examples 27 to 29 or any other method of process described herein, each one of the one or more Synchronization Signal blocks comprises a Primary Synchronization Signal symbol, a Secondary Synchronization Signal symbol and two or more Physical Broadcast Channel symbols.

In Example 31, which may include the subject matter of any of examples 27 to 29 of any other method of process described herein, each one of the one or more Synchronization Signal blocks comprises a Primary Synchronization Signal symbol, a Secondary Synchronization Signal symbol and three or more Physical Broadcast Channel symbols.

Example 32, which may include the subject matter of any of examples 26 to 31 or any other method or process described herein, may further comprise: a gap periodicity, wherein the gap periodicity is a frequency of repetition of gaps in a respective frequency layer; and a gap offset, wherein the gap offset is a start position of a measurement gap in the gap periodicity.

In Example 33, which may include the subject matter of example 32 or any other method or process described herein, the gap periodicity is always greater than or equal to 40 ms.

Example 34, which may include the subject matter of any of examples 26 to 33 or any other method of s described herein, may further comprise the apparatus configured to: determine on which one of the plurality of frequency layers of the wireless network the User Equipment will perform cell measurement at a specific measurement gap occasion using the determined gap bitmap and a measurement priority rule.

In Example 35, which may include the subject matter of example 34 or any other method or process described herein, the less network further comprises at least one legacy LTE frequency layer, and the measurement priority rule is configured to prioritize measurement of the LTE frequency layer when a measurement gap occasion of the LTE frequency layer collides with a measurement gap occasion of a New Radio frequency layer in time domain.

In Example 36, which may include the subject matter of example 34 or any other method or process described herein, the wireless network further comprises at least one legacy LTE frequency layer, and the measurement priority rule is configured to prioritize measurement of a New Radio frequency layer when a measurement gap occasion of the LTE frequency layer collides with a measurement gap occasion of the New Radio frequency layer in time domain.

In Example 37, which may include the subject matter of any of examples 26 to 36 or any other method or process described herein, the gap bitmap is configured to guarantee that the Measurement Gap Length in each 40 ms period does not exceed 6 ms.

In Example 38, which may include the subject matter of any of examples 26 to 37 or any other method or process described herein, the gap bitmap indicates the measurement gap availability in the time sequence by using bits of the gap bitmap to indicate whether a respective measurement gap occasion is available for performing measurement by the User Equipment or whether the respective measurement gap occasion has been disabled.

In Example 3 R id include the subject matter of example 38 or any other method of process described herein, setting a bit of the gap bitmap to '1' indicates that the respective measurement gap occasion is available for performing measurement by the User Equipment; and setting a bit of the gap bitmap to '0' indicates that the respective measurement gap occasion is disabled and therefore is not available for performing measurement by the User Equipment.

Example 40 may provide a computer-readable media comprising instructions to cause an electronic device, upon execution of the instructions by one or more processors of the electronic device, to perform one or more elements of a method in a User Equipment for cell measurement in a wireless network, wherein the wireless network comprises a plurality of New Radio frequency layers, the method comprising: receiving gap assistance information for each one of a plurality of frequency layers of the wireless network from a Base Station, wherein the gap assistance information comprises at least a determined Measurement Gap Length and a determined gap bitmap; determining on which one of the plurality of frequency layers of the wireless network the User Equipment will perform cell measurement at a specified measurement gap occasion using the determined gap bitmap and a measurement priority rule; and performing cell measurement on the determined frequency layer of the plurality of frequency layers of the wireless network within the specified measurement gap occasion.

In Example 41, which may include the subject matter of example 41 or any other method or process described herein, the gap assistance information further comprises one or more of: a gap periodicity, wherein the gap periodicity is a frequency of repetition of gaps in a respective frequency layer; and a gap offset, wherein the gap offset is a start position of a measurement gap in the gap periodicity.

In Example 42, which may include the subject matter of examples 40 or 41 or any other method or process described herein, the wireless network further comprises at least one legacy LTE frequency layer, and the measurement priority rule is configured to prioritize measurement of the LTE frequency layer when a measurement gap occasion of the LTE frequency layer collides with a measurement gap occasion of a New Radio frequency layer in time domain.

In Example 43, which may include the subject matter of examples 40 or 41 or any other method or process described herein, the wireless network further comprises at least one legacy LTE frequency layer, and the measurement priority rule is configured to prioritize measurement of a New Radio frequency layer when a measurement gap occasion of the LTE frequency layer collides with a measurement gap occasion Radio frequency layer in time domain.

In Example 44, which may include the subject matter of any of examples 40 to 43 or any other method or process described herein, the gap bitmap indicates the measurement gap availability in the time sequence by using bits of the gap bitmap to indicate whether a respective measurement gap occasion is available for performing measurement by the User Equipment of whether the measurement gap occasion has been disabled.

In Example 45, which may include the subject matter of any of examples 40 to 44 or any other method or process described herein, a bit of the gap bitmap having a value of '1' indicates that the respective measurement gap occasion is available for performing measurement by the User Equipment; and a bit of the gap bitmap having a value of '0' indicates that the respective measurement gap occasion is disabled and therefore is not available for performing measurement by the User Equipment.

Example 46 may provide a base station apparatus for cell measurement in a wireless network, wherein the wireless network comprises a plurality of New Radio frequency layers, the apparatus comprising: means for determining a Measurement Gap Length, MGL, for each one of a plurality of frequency layers operational in the wireless network; means for determining a gap bitmap to indicate a measurement gap availability in a time sequence for each one of the plurality of frequency layers of the wireless network; and means for transmitting gap assistance information for each one of the plurality of frequency layers of the wireless network to a User Equipment, wherein the gap assistance information comprises at least the determined Measurement Gap Length and the determined gap bitmap.

Example 47, which may include the subject matter of example 46 or any other method or process described herein, may further comprise means for determining a number of subframes required to contain a maximum number of one or more Synchronization Signal blocks; and means for setting the Measurement Gap Length to a length of time longer than a time duration taken to send the number of subframes required to contain the maximum number of the one or more Synchronization Signal blocks.

Example 48, which may include the subject matter of examples 46 or 47 or any other method or process described herein, may further comprise means for determining on which one of the plurality of frequency layers of the wireless network the User Equipment will perform cell measurement at a specific measurement gap occasion using the determined gap bitmap and a measurement priority rule.

Example 49, which may include the subject matter of any of examples 46 to 48 or any other method or process described herein, may further comprise means for configuring the gap bitmap to guarantee that the Measurement Gap Length in each 40 ms period does not exceed 6 ms.

Example 50, which may include the subject matter of any of examples 46 to 49 or any other method or process described herein, may further comprise means for indicating the measurement gap availability in re time sequence by using bits of the gap bitmap to indicate whether a respective measurement gap occasion is available for performing measurement by the User Equipment or whether the respective measurement gap occasion has been disabled.

The foregoing descript on of one or more implementations provides illustration and description, but is not intended to be exhaustive or to limit the scope of embodiments to the precise form disclosed. Modifications and variations are possible in light of the above teachings or may be acquired from practice of various embodiments.

The invention claimed is:

1. A method comprising:
   receiving, from a base station in a wireless network, measurement gap assistance information for a first frequency range and a second frequency range operational in the wireless network, the measurement gap assistance information comprising, for each of the first and second frequency ranges, a gap repetition period, a gap offset, and a gap length, wherein the gap length comprises one of 3 ms, 4 ms or 5.5 ms;
   determining a measurement gap configuration for the first frequency range based at least on the gap offset, the gap repetition period and the gap length for the first frequency range; and
   determining a measurement gap configuration for the second frequency range based at least on the gap offset, the gap repetition period and the gap length for the second frequency range.

2. The method of claim 1, wherein the measurement gap assistance information for each of the first and second frequency ranges further comprises a gap pattern.

3. The method of claim 2, wherein the measurement gap configurations for the first and second frequency ranges are further determined based on the respective gap pattern.

4. The method of claim 1, further comprising:
   performing cell measurement on at least one of the first and second frequency ranges based on the respective measurement gap configuration.

5. The method of claim 1, wherein the gap repetition period comprises one of 40 ms or 80 ms.

6. An apparatus comprising:
   one or more processors; and
   memory storing instructions that, when executed, are configured to cause the one or more processors to perform operations comprising:

receiving, from a base station in a wireless network, measurement gap assistance information for a first frequency range and a second frequency range operational in the wireless network, the measurement gap assistance information comprising, for each of the first and second frequency ranges, a gap repetition period, a gap offset, and a gap length, wherein the gap length comprises one of 3 ms, 4 ms or 5.5 ms;

determining a measurement gap configuration for the first frequency range based at least on the gap offset, the gap repetition period and the gap length for the first frequency range; and determining a measurement gap configuration for the second frequency range based at least on the gap offset, the gap repetition period and the gap length for the second frequency range.

7. The apparatus of claim 6, wherein the measurement gap assistance information for each of the first and second frequency ranges further comprises a gap pattern.

8. The apparatus of claim 7, wherein the measurement gap configurations for the first and second frequency ranges are further determined based on the respective gap pattern.

9. The apparatus of claim 6, wherein the operations further comprise:
performing cell measurement on at least one of the first and second frequency ranges based on the respective measurement gap configuration.

10. The apparatus of claim 6, wherein the gap repetition period comprises one of 40 ms or 80 ms.

11. The apparatus of claim 6, wherein the one or more processors comprise a baseband processor for a user equipment (UE).

12. The apparatus of claim 6, wherein the apparatus comprises a UE.

13. One or more non-transitory computer-readable media storing instructions that, when executed, are configured to cause one or more processors to perform operations comprising:

receiving, from a base station in a wireless network, measurement gap assistance information for a first frequency range and a second frequency range operational in the wireless network, the measurement gap assistance information comprising, for each of the first and second frequency ranges, a gap repetition period, a gap offset, and a gap length, wherein the gap length comprises one of 3 ms, 4 ms or 5.5 ms;

determining a measurement gap configuration for the first frequency range based at least on the gap offset, the gap repetition period and the gap length for the first frequency range; and determining a measurement gap configuration for the second frequency range based at least on the gap offset, the gap repetition period and the gap length for the second frequency range.

14. The one or more non-transitory computer-readable media of claim 13, wherein the measurement gap assistance information for each of the first and second frequency ranges further comprises a gap pattern.

15. The one or more non-transitory computer-readable media of claim 14, wherein the measurement gap configurations for the first and second frequency ranges are further determined based on the respective gap pattern.

16. The one or more non-transitory computer-readable media of claim 13, wherein the operations further comprise:
performing cell measurement on at least one of the first and second frequency ranges based on the respective measurement gap configuration.

17. The one or more non-transitory computer-readable media of claim 13, wherein the gap repetition period comprises one of 40 ms or 80 ms.

18. The one or more non-transitory computer-readable media of claim 13, wherein the one or more processors comprise a baseband processor for a user equipment (UE).

\* \* \* \* \*